(12) United States Patent
Sato (10) Patent No.: US 8,379,259 B2
(45) Date of Patent: *Feb. 19, 2013

(54) IMAGE FORMING SYSTEM, DEVICE MANAGING METHOD THEREOF, AND PROGRAM THEREFOR

(75) Inventor: Eiichi Sato, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,343

(22) Filed: Apr. 24, 2012

(65) Prior Publication Data

US 2012/0206769 A1 Aug. 16, 2012

Related U.S. Application Data

(63) Continuation of application No. 12/143,739, filed on Jun. 20, 2008, now Pat. No. 8,184,322.

(30) Foreign Application Priority Data

Jul. 5, 2007 (JP) ................................ 2007-177633

(51) Int. Cl.
*G06F 15/00* (2006.01)
*G06F 17/00* (2006.01)
(52) U.S. Cl. ...................................... 358/1.15; 235/375

(58) Field of Classification Search .................. 358/1.15
See application file for complete search history.

(56) References Cited

U.S. PATENT DOCUMENTS 8,184,322 B2 * 5/2012 Sato ............................ 358/1.15
2007/0047524 A1 3/2007 Moriya

FOREIGN PATENT DOCUMENTS

JP 2002-312140 A 10/2002

* cited by examiner

*Primary Examiner* — Saeid Ebrahimi Dehkordy
(74) *Attorney, Agent, or Firm* — Rossi, Kimms & McDowell LLP

(57) ABSTRACT

An image forming system includes an image forming apparatus and a controlling apparatus connected to each other through a network and having different addresses. Information, indicating that the image forming apparatus and the controlling apparatus are connected to each other also by a communication medium that is different from the network, is registered in at least one of the image forming apparatus and the controlling apparatus. A search request for searching an apparatus connected to the network is received. The information registered by the registering unit is provided as a response to the search request. Based on the response, it is displayed that the image forming apparatus and the controlling apparatus are connected to each other by the communication medium.

7 Claims, 12 Drawing Sheets

IMAGE FORMING SYSTEM, DEVICE MANAGING METHOD THEREOF, AND PROGRAM THEREFOR

This is a continuation of and claims benefit to U.S. patent application Ser. No. 12/143,739, filed Jun. 20, 2008, the content of which is incorporated herein by reference. These applications claim priority to JP Application No. JP2007-177633, filed Jul. 5, 2007.

BACKGROUND OF THE INVENTION

1. Field of the Invention

The present invention relates to an image forming system including a device such as an image forming apparatus connectable to a network, a device managing method thereof, and a program for executing the device managing method.

2. Description of the Related Art

Figure 10:
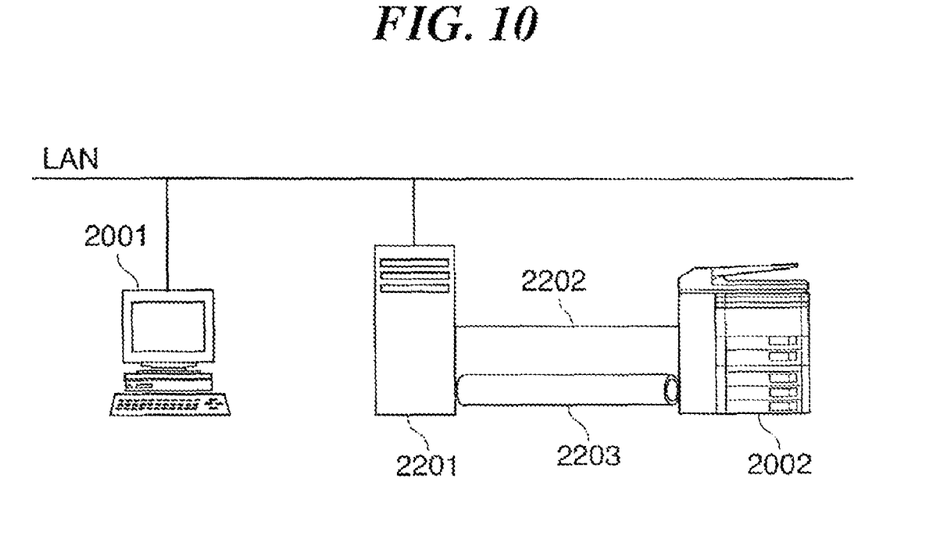
FIG. 10 is a view which is useful in illustrating an exemplary configuration of a conventional image forming system.

Conventionally, a technique of this type field is, for example, illustrated in FIG. 10.

FIG. 10 is a view which is useful in illustrating an exemplary configuration of a conventional image forming system.

This image forming system is provided with an image forming apparatus 2002 connected to a LAN through a print controlling apparatus 2201. The print controlling apparatus 2201 and the image forming apparatus 2002 are connected by a communication line 2202 and an image signal connection line 2203.

The print controlling apparatus 2201 is utilized to provide the image forming apparatus 2002 with a function of a network printer, or to expand or enhance the function of a network printer which is previously provided in the image forming apparatus 2002. The function of a network printer is to print out an image according to an image signal inputted from an external apparatus through a network. Conventionally, when the print controlling apparatus 2201 is used, the print controlling apparatus 2201 is connected to the LAN to be able to communicate with another device on the LAN.

On the other hand, the communication line 2202 to be originally connected to the LAN in the image forming apparatus 2002 is used to be locally connected to the print controlling apparatus 2201. The print controlling apparatus 2201 and the image forming apparatus 2002 are connected one-on-one on a network, and are disconnected from the LAN to which another device is connected, so that the image forming apparatus 2002 can communicate with only the print controlling apparatus 2201 through the communication line 2202. Generally, image data in which an amount of information is huge, and a high rate communication is requested is communicated between the print controlling apparatus 2201 and the image forming apparatus 2002 through the image signal connection line 2203 (connecting unit).

A computer apparatus 2001 (information processing apparatus) is connected to the LAN. A device monitoring and managing program, which monitors and manages a device connected on the LAN, is executed in the computer apparatus 2001. The SNMP (Simple Network Management Protocol) defined by the RFC 1157 is generally used to monitor and manage the device connected on the LAN.

The computer apparatus 2001 transfers a request packet for reading the necessary MIB (Management Information Base) object on the LAN by a broadcast method by using the SNMP protocol. When there is a device which can respond to this broadcast packet on the LAN, the device transmits a response of the MIB object requested by using the SNMP to the computer apparatus 2001. When there are a plurality of devices to be managed on the LAN, this response is executed by all the devices to be managed.

The device monitoring and managing program executed on the computer apparatus 2001 detects, in the above sequence, a device, such as the image forming apparatus and the print controlling apparatus, which is connected on the LAN and is to be managed by the own program.

Figure 11:
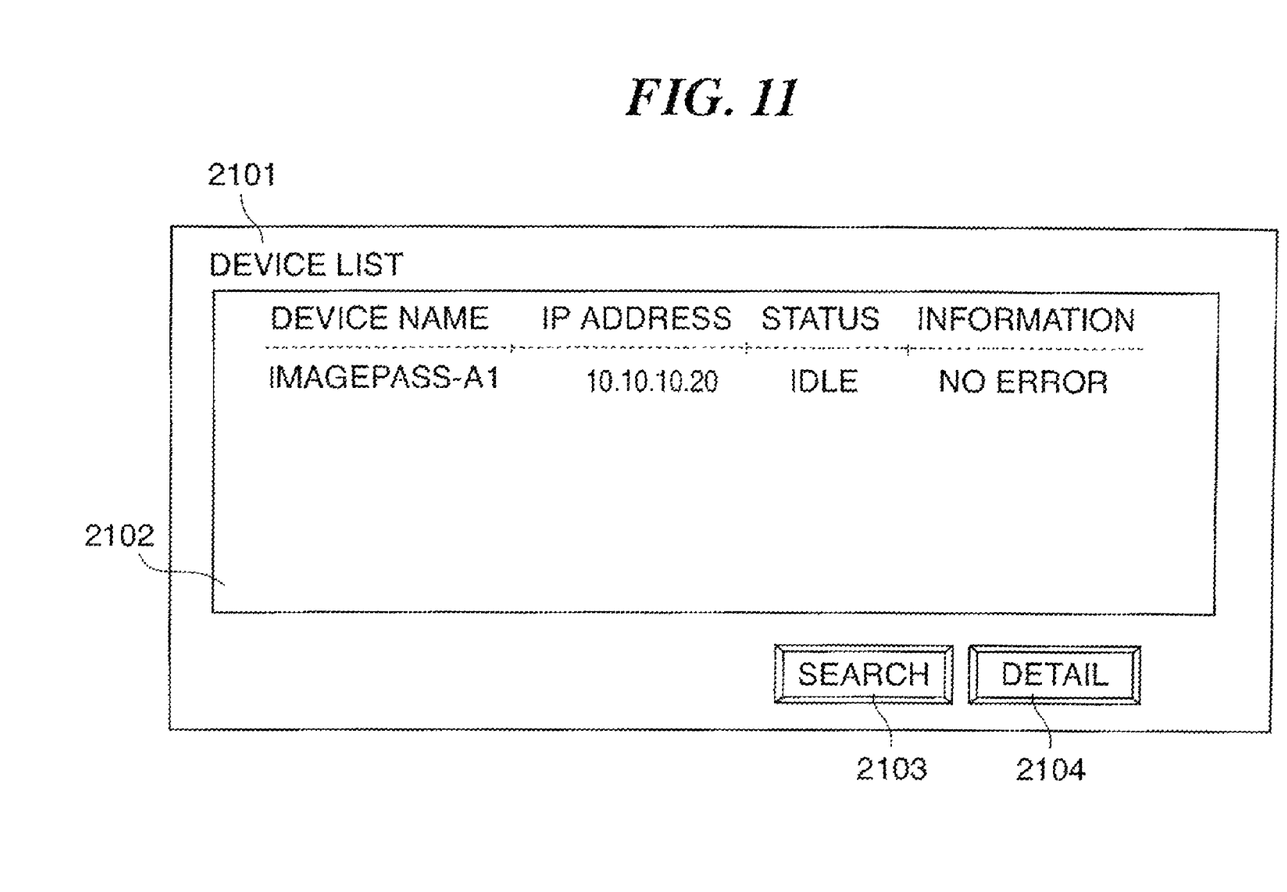
FIG. 11 is a view which is useful in illustrating an example of a conventional device list shown in a display of the computer apparatus 2001 in FIG. 10.

In the above configuration of FIG. 10, such a result is illustrated in FIG. 11 that the device, which is connected on the LAN and is to be managed, is searched by using the device monitoring and managing program executed on the computer apparatus 2001. FIG. 11 is a view which is useful in illustrating an example of a conventional device list shown in a display of the computer apparatus 2001 in FIG. 10.

In the configuration of FIG. 10, only the print controlling apparatus 2201 is connected to the LAN, thereby causing only the print controlling apparatus 2201 to be detected, which causes information relating to the print controlling apparatus 2201 to be displayed in a window box 2102 of a device list 2101, as illustrated in FIG. 11.

However, the connection configuration of the image forming system illustrated in FIG. 10 provides the following problems.

The recent image forming apparatus 2002 is multi-functioned as a multi-function device, and then is directly connected to the LAN to provide another network device connected to the LAN with many functions. The examples are set forth below.

(1) A printing job server function of enabling a printing job to be transferred from the computer apparatus 2001 on the LAN to the image forming apparatus 2002.

(2) A transmitting function of transmitting image data scanned by a scanner to another network device connected on the LAN.

(3) A Web server function of enabling a variety of settings and a status display of the image forming apparatus 2002 by using a Web browser of the computer apparatus 2001 on the LAN.

While many network functions other than the exemplified functions are also provided from a vender of each image forming apparatus, in the connection configuration illustrated in FIG. 10, the high-level and highly-convenient network functions provided by such an image forming apparatus 2002 has not been able to be utilized.

Thus, in the print controlling apparatus 2201, a technique has been adopted which relays the communication between the LAN and the image forming apparatus 2002. Since it is necessary for this technique to rewrite header information of a communication packet, as the functions of the image forming apparatus 2002 are upgraded higher, and the functions provided to the network are increased more, the load applied to the print controlling apparatus 2201 has tended to be increased more (for example, refer to Japanese Laid-Open Patent Publication (Kokai) No. 2002-312140).

As described above, in the conventional technique, a load, which is induced when the print controlling apparatus 2201 relays the communication packet, is increased to the extent that the network functions provided by the image forming apparatus 2002 are increased. As a result, the large adverse effect has been applied to the print data process to be originally executed by the print controlling apparatus 2201. Every time the network function of the image forming apparatus 2002 is added, it is necessary to change a communication packet relaying process of the print controlling apparatus

2201, which provides one cause for increasing a development cost or a manufacture cost for the print controlling apparatus 2201.

Figure 12:
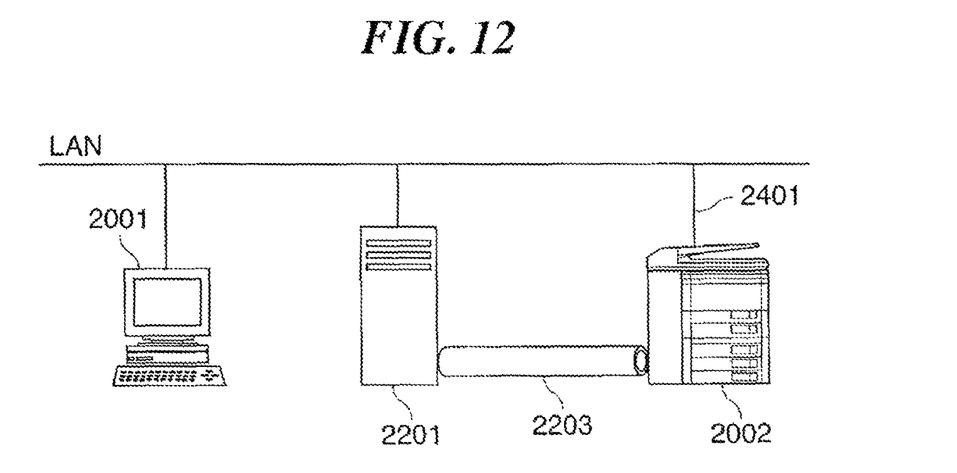
FIG. 12 is a view which is useful in illustrating an exemplary configuration of another conventional image forming system.

A connection configuration of an exemplary configuration of the image forming system as illustrated in FIG. 12 can be considered as a method for solving such a problem. As illustrated in FIG. 12, in this connection configuration, the communication line 2202 illustrated in FIG. 10 is removed, the image forming apparatus 2002 is directly connected to the LAN through a LAN cable 2401. That is, in such a configuration as that the print controlling apparatus 2201 is connected to the image forming apparatus 2002, this is such a connection configuration that the print controlling apparatus 2201 and the image forming apparatus 2002 are connected to the LAN respectively.

This eliminates the need for relaying the communication packet of the network function provided by the image forming apparatus 2002, the communication packet having been relayed by the print controlling apparatus 2201, thereby largely reducing the process load of the print controlling apparatus 2201, which enables the print controlling apparatus 2201 to be developed and manufactured without depending on the expansion of the network function of the image forming apparatus 2002.

Figure 13:
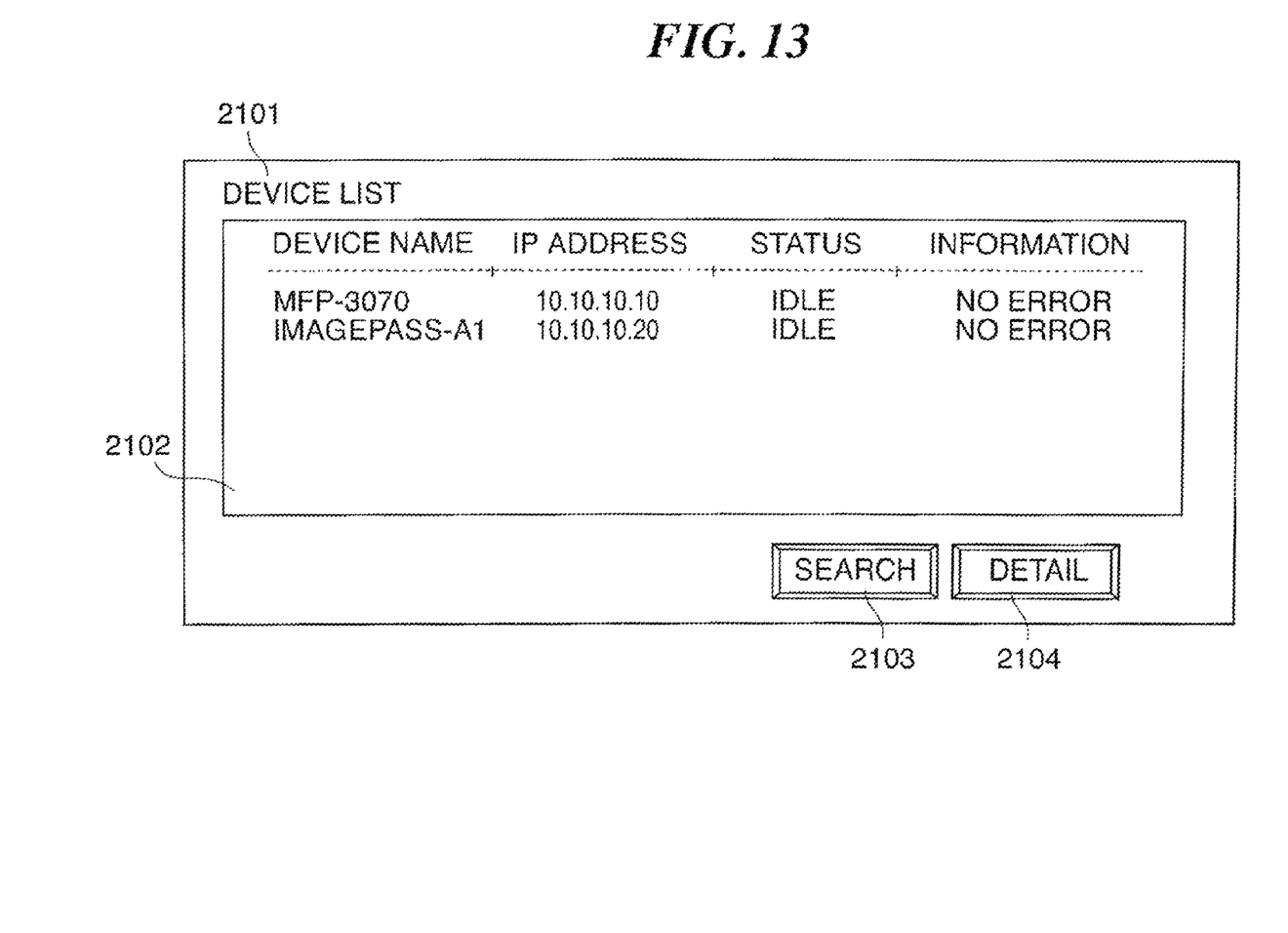
FIG. 13 is a view which is useful in illustrating an example of another conventional device list shown in a display of the computer apparatus 2001 in FIG. 12.

However, in the image forming system of the connection configuration illustrated in FIG. 12, searching the device to be managed on the computer apparatus 2001 (information processing apparatus) provides a problem that a plurality of the devices on the network are detected, as illustrated in FIG. 13. That is, when the device to be managed is searched on the computer apparatus 2001, both the print controlling apparatus 2201 and the image forming apparatus 2002 respond to the searching. The print controlling apparatus 2201 and the image forming apparatus 2002 are connected by the image signal connection line 2203, and such apparatuses may operate in pairs as one printing device. In such a case, while one print service is actually provided, the search result becomes as if two print services were provided. Thus, a user may have been unable to correctly determine which device of the detected devices a print job should be transmitted to.

An interconnection relation is not apparent between the print controlling apparatus 2201 and the image forming apparatus 2002. Thus, if there are a plurality of the print controlling apparatuses and the image forming apparatuses whose connection configurations are the same on the LAN, and all of such apparatuses are displayed in the window box 2102 of a device list 2101, the user may be further confused. That is, the user cannot correctly determine a connection relation between the print controlling apparatus 2201 and the image forming apparatus 2002, and cannot quickly and surely set up.

SUMMARY OF THE INVENTION

In consideration of the above conventional problem, the present invention provides an image forming system, a device managing method thereof, and a program therefore, capable of realizing the followings.

(1) To provide such a connection configuration as that the network function provided by the image forming apparatus can be sufficiently utilized, even when the print controlling apparatus and the image forming apparatus are connected to each other.

(2) To eliminate the adverse effect which is induced in the above connection configuration when the device to be managed is searched, and provide the smooth and secure setting up environment to the user.

In a first aspect of the invention, there is provided an image forming system comprising an image forming apparatus and a controlling apparatus which are connected to each other through a network and have different addresses set thereto, respectively, comprising: a registering unit adapted to register information, indicating that the image forming apparatus and the controlling apparatus are connected to each other also by a communication medium that is different from the network, in at least one of the image forming apparatus and the controlling apparatus; a receiving unit adapted to receive a searching request for searching an apparatus connected to the network; a responding unit adapted to respond the information registered by the registering unit in a case that the searching request is received by receiving unit; and a displaying unit adapted to display that the image forming apparatus and the controlling apparatus are connected to each other by the communication medium, based on the information responded by the responding unit.

In a second aspect of the invention, there is provided with an n image forming system comprising an image forming apparatus and a controlling apparatus which are connected to each other through a network and have different addresses set thereto, respectively, comprising: a registering unit adapted to register information indicating an interdependence relation between the image forming apparatus and the controlling apparatus in the image forming apparatus and the controlling apparatus; a receiving unit adapted to receive a searching request for searching an apparatus connected to the network, and disposed in each of the image forming apparatus and the controlling apparatus; a responding unit adapted to respond the information registered by said registering unit in a case that the searching request is received by said receiving unit, and disposed in each of the image forming apparatus and the controlling apparatus; and a displaying unit adapted to display that the image forming apparatus and the controlling apparatus are interdependence-related to each other based on the information responded by said responding unit.

In a third aspect of the invention, there is provided a device managing method of an image forming system comprising an image forming apparatus and a controlling apparatus which are connected to each other through a network and have different addresses set thereto, respectively, the device managing method comprising: a registering step of registering information, indicating that the image forming apparatus and the controlling apparatus are connected to each other also by a communication medium that is different from the network, in at least one of the image forming apparatus and the controlling apparatus; a receiving step of receiving a searching request for searching an apparatus connected to the network; a responding step of responding the information registered at the registering step in a case that the searching request is received at receiving step; and a displaying step of displaying that the image forming apparatus and the controlling apparatus are connected to each other by the communication medium, based on the information responded at the responding step.

In a fourth aspect of the invention, there is provided with a device managing method of an image forming system comprising an image forming apparatus and a controlling apparatus which are connected to each other through a network and have different addresses set thereto, respectively, the device managing method comprising: a registering step of registering information indicating an interdependence relation between the image forming apparatus and the controlling apparatus in the image forming apparatus and the controlling apparatus; a receiving step of receiving a searching request for searching an apparatus connected to the network, the receiving step being carried out by each of the image forming apparatus and the controlling apparatus; a responding step of responding the information registered at the registering step in a case that the searching request is received at the receiving step, the responding step being carried out by in each of the image forming apparatus and the controlling apparatus; and a displaying unit adapted to display that the image forming apparatus and the controlling apparatus are interdependence-related to each other based on the information responded by the responding unit.

In a fifth aspect of the invention, there is provided a program that causes a computer to execute a device managing method of an image forming system comprising an image forming apparatus and a controlling apparatus which are connected to each other through a network and have different addresses set thereto, respectively, the device managing method comprising: a registering step of registering information, indicating that the image forming apparatus and the controlling apparatus are connected to each other also by a communication medium that is different from the network, in at least one of the image forming apparatus and the controlling apparatus; a receiving step of receiving a searching request for searching an apparatus connected to the network; a responding step of responding the information registered at the registering step in a case that the searching request is received at receiving step; and a displaying step of displaying that the image forming apparatus and the controlling apparatus are connected to each other by the communication medium, based on the information responded at the responding step.

In a sixth aspect of the invention, there is a program that causes a computer to execute a device managing method of an image forming system comprising an image forming apparatus and a controlling apparatus which are connected to each other through a network and have different addresses set thereto, respectively, the device managing method comprising: a registering step of registering information indicating an interdependence relation between the image forming apparatus and the controlling apparatus in the image forming apparatus and the controlling apparatus; a receiving step of receiving a searching request for searching an apparatus connected to the network, the receiving step being carried out by each of the image forming apparatus and the controlling apparatus; a responding step of responding the information registered at the registering step in a case that the searching request is received at the receiving step, the responding step being carried out by in each of the image forming apparatus and the controlling apparatus; and a displaying step of displaying that the image forming apparatus and the controlling apparatus are interdependence-related to each other based on the information responded at the responding step.

According to the present invention, it is possible to provide such a connection configuration as that the network function provided by the image forming apparatus can be sufficiently utilized, even when the controlling apparatus and the image forming apparatus are connected to each other, and further it is possible to eliminate the adverse effect which is induced in the connection configuration when the device to be managed is searched, and to provide the smooth and secure setting up environment to the user.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Configuration of Image Forming System

The connection configuration of an exemplary configuration of the image forming apparatus illustrated in the above FIG. 12 is used for the connection configuration of the image forming system according to an embodiment of the present invention. Internal configurations of an information processing apparatus 100, a print controlling apparatus 200, and an image forming apparatus 300, which are configured in the image forming system according to the present embodiment, will be described below. Meanwhile, each of the information processing apparatus 100, the print controlling apparatus 200, and the image forming apparatus 300 corresponds to the computer apparatus 2001, the print controlling apparatus 2201 and the image forming apparatus 2002 which are illustrated in FIG. 12.

Figure 1:
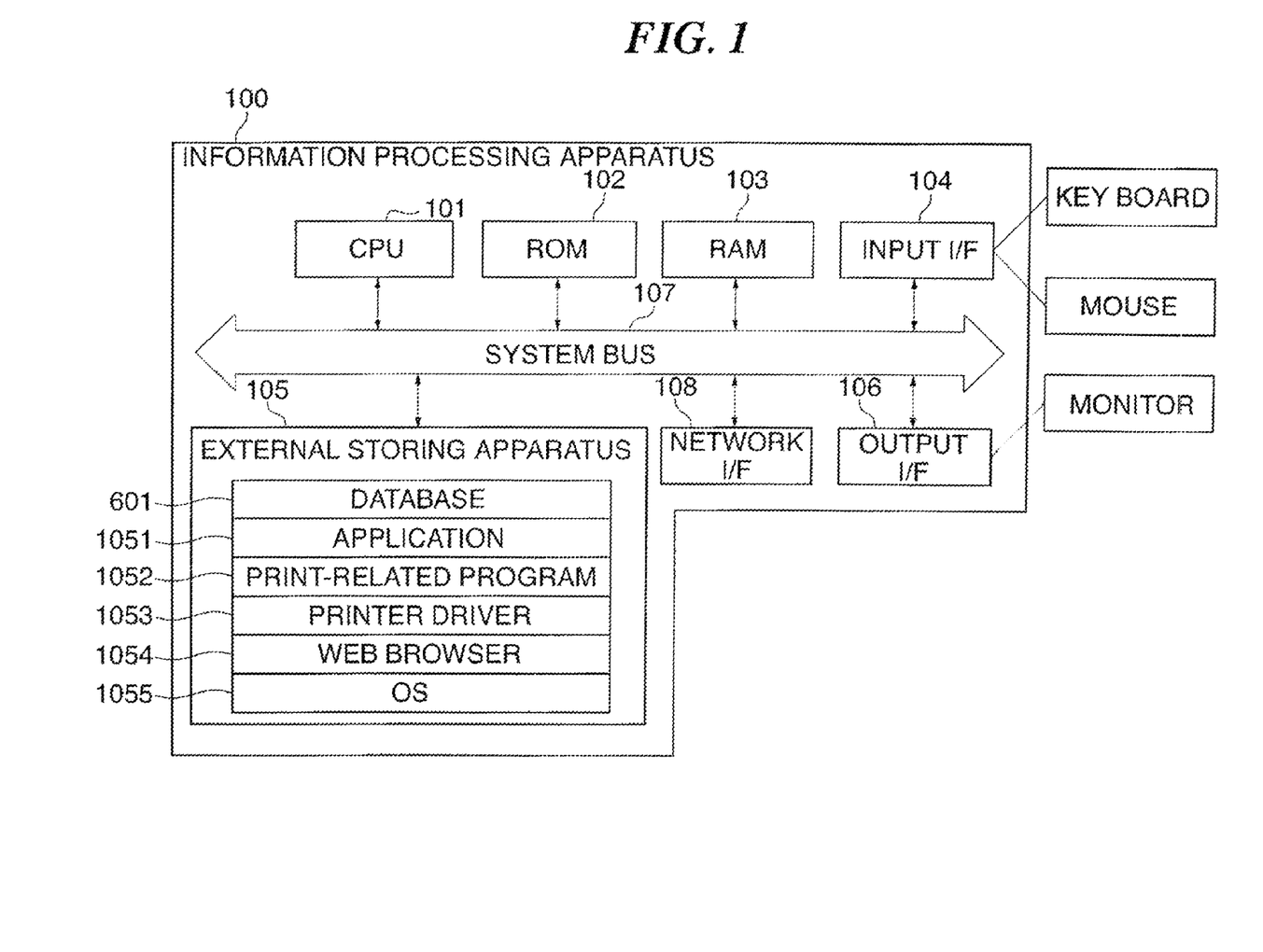
FIG. 1 is a block diagram illustrating a configuration of an information processing apparatus in an image forming system according to the present invention.

First, a configuration of the information processing apparatus 100 will be described.

FIG. 1 is a block diagram illustrating the configuration of the information processing apparatus 100 in the image forming system according to the present invention.

In the information processing apparatus 100, a CPU 101, a ROM 102, a RAM 103, an input interface (I/F) 104, an external storing apparatus 105, an output interface 106, and a network interface 108 are connected to a system bus 107.

The CPU 101 controls the whole apparatus according to programs stored in the ROM 102, the RAM 103, or the external storing apparatus 105. The RAM 103 is used as a work area when the CPU 101 executes a variety of processes. The external storing apparatus 105 stores a database 601 storing interdependence-related device identification information (refer to FIG. 8 described later) which is featured by the present invention. The external storing apparatus 105 also stores application software 1051, a print-related program 1052, a printer driver 1053, a Web browser 1054, and an operating system (OS) 1055.

An input device such as a key board and a mouse is used for a user to provide the information processing apparatus 100 with a variety of instructions through the input I/F 104. The output I/F 106 is for outputting data to outside, e.g. a monitor.

The network I/F 108 includes a function of communicating data with an external device, such as the print controlling apparatus of FIG. 2 described later and the image forming apparatus of FIG. 3 described later, from the information processing apparatus 100 through a network such as the LAN.

Next, a description will be given of a configuration of a print controlling apparatus 200.

Figure 2:
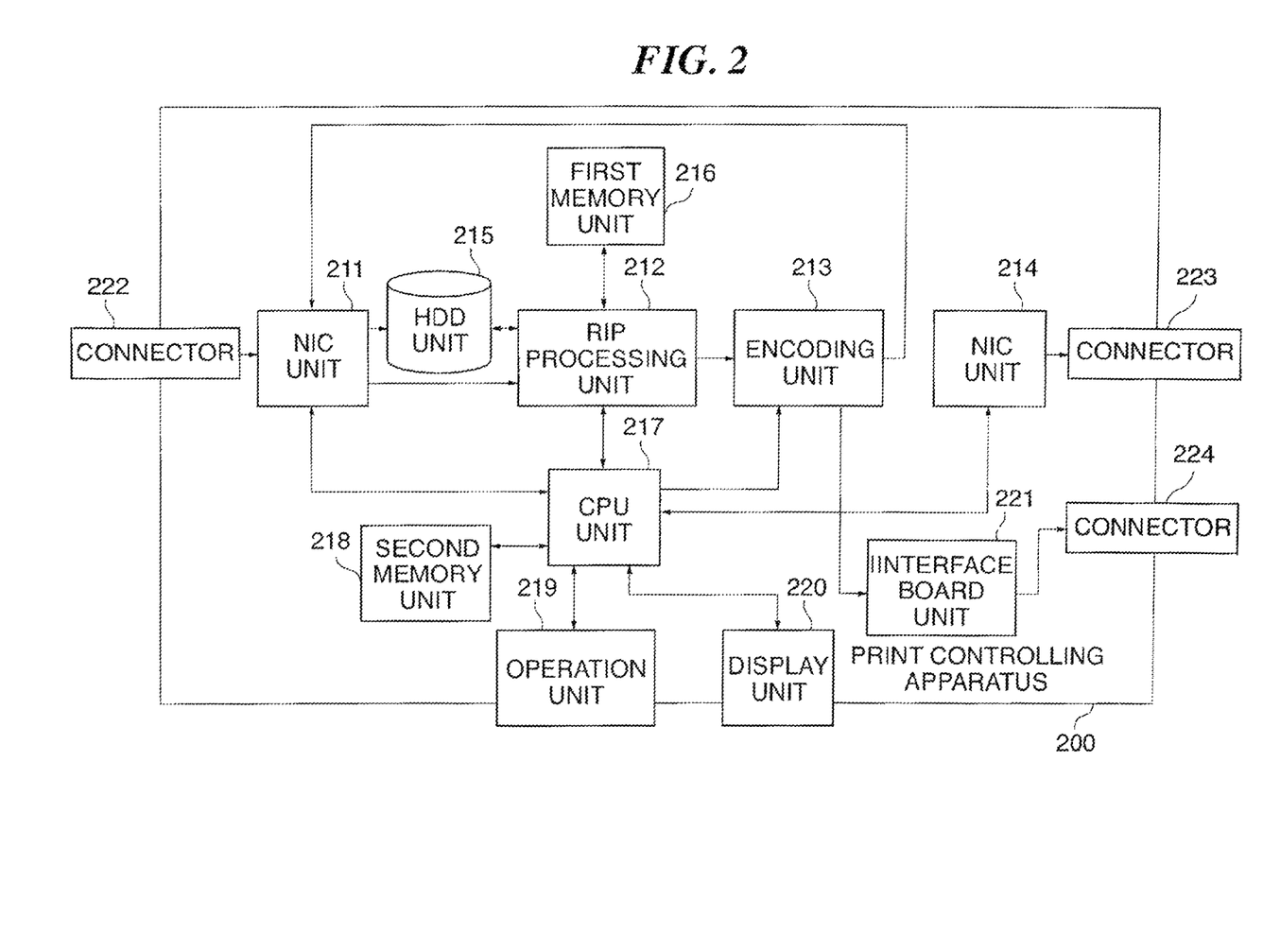
FIG. 2 is a block diagram illustrating a configuration of a print controlling apparatus in the image forming system according to the present invention.

FIG. 2 is a block diagram illustrating the configuration of the print controlling apparatus 200 in the image forming system according to the present embodiment.

In FIG. 2, the print controlling apparatus 200 includes a connector 222 for inputting data, and an NIC (Network Interface Card) unit 211 is connected to the connector 222. The NIC unit 211 includes a function as a first network interface for controlling a low layer level connection to the LAN.

An output side of the NIC unit 211 is connected to a RIP processing unit 212 and a hard disk drive (HDD) unit 215. The RIP processing unit 212 includes a function of converting a received print language such as the PDL or a specific (compressed by the JBIG, and the like) data format to a raster image. The HDD unit 215 is for temporarily spooling print data received by the NIC unit 211, or temporarily spooling RIP-processed compressed data. A first memory unit 216 is utilized by the RIP processing unit 212 for an image developing process.

The data, which is converted to the raster image by the RIP processing unit 212, is inputted to an encoding unit 213, and is converted by the encoding unit 213 to print data in a format or a data format supported by the image forming apparatus 300.

The print controlling apparatus 200 is provided with an NIC unit 214 and an image interface board unit 221. The NIC unit 214 functions as a second network interface for controlling the lower layer level connection, and a connector 223 is a connector for this interface. The data outputted from the encoding unit 213 is outputted to a connector 224 through the image interface board unit 221.

In addition, the print controlling apparatus 200 is provided with a CPU unit 217, a second memory unit 218, an operation unit 219, and a display unit 220. The CPU unit 217 controls the whole print controlling apparatus 200, and the second memory unit 218 is utilized by the CPU unit 217 as an area for temporary storing data. The second memory unit 218 stores a database 401 (refer to FIG. 6 described later) storing device identification information which is featured by the present invention.

The operation unit 219 includes a button, a key, and the like, and executes an operation for the print controlling apparatus 200. The display unit 220 is configured with a touch panel, and the like, for transferring information to a user with an image and a character, and is integrally configured with the operation unit 219 as an operation panel.

Next, a description will be given of a configuration of the image forming apparatus 300.

Figure 3:
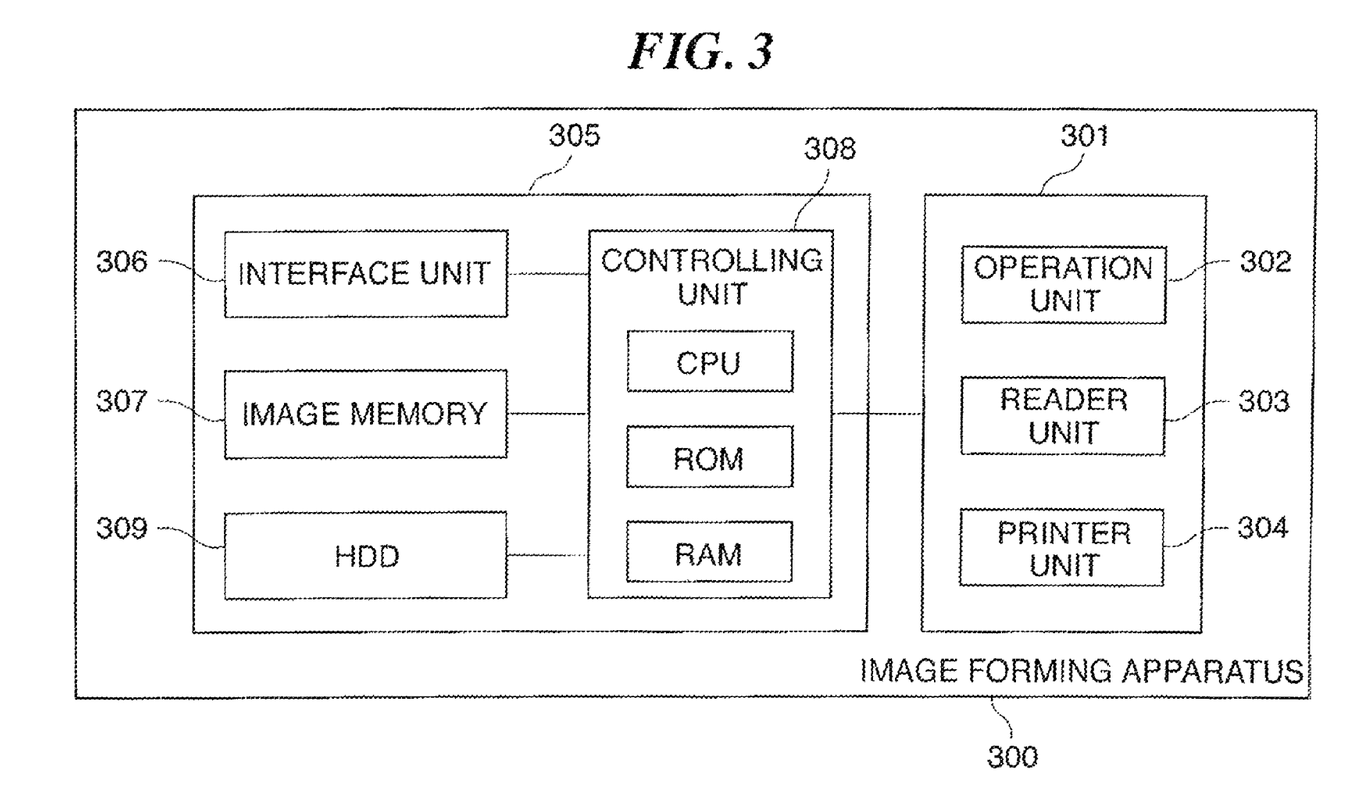
FIG. 3 is a block diagram illustrating a configuration of an image forming apparatus in the image forming system according to the present invention.

FIG. 3 is a block diagram illustrating the configuration of the image forming apparatus 300 in an image forming system according to the present invention.

The image forming apparatus 300 of the present embodiment is configured with an image forming apparatus main unit 301 and an image input/output controlling unit 305.

The image forming apparatus main unit 301 is configured with an operation unit 302, a reader unit 303, and a printer unit 304. The operation unit 302 is used to operate the image forming apparatus main unit 301 and the image input/output controlling unit 305, and includes an operation panel for displaying information. The reader unit 303 reads an image of a manuscript, and outputs image data corresponding to the manuscript image to the printer unit 304 and the image input/output controlling unit 305. The printer unit 304 records, on recording paper, an image corresponding to the image data from the reader unit 303 and the image input/output controlling unit 305.

The image input/output controlling unit 305 is connected to the reader unit 303, and is configured with an interface unit 306, an image memory 307, a controlling unit 308, and a hard disk (HDD) 309.

Meanwhile, setting information on the image forming apparatus 300 is stored in the hard disk (HDD) 309. For example, the hard disk 309 stores, as the setting information, an address book, an operation history, a user setting, an ID setting, a network setting, and also the database 401 (refer to FIG. 6 described later) storing the device identification information which is featured by the present invention.

The interface unit 306 is an interface between the print controlling apparatus 200 and the controlling unit 308. The interface unit 306 develops code data expressing an image transferred from the print controlling apparatus 200 to image data which can be recorded by the printer unit 304, and transfers the image data to the controlling unit 308. Meanwhile, the interface unit 306 is a network interface such as the Ethernet (Registered trade mark), and may be also configured to be connected with the print controlling apparatus 200 through a network. The interface unit 306 is an interface such as a parallel interface and the USB interface, and may be also configured to be directly connected with the print controlling apparatus 200 through an interface cable. The interface unit 306 may use one cable, and also a plurality of cables.

The controlling unit 308 is configured with a CPU, a ROM, and a RAM. The CPU of the controlling unit 308 loads a program stored in the ROM, or another recording medium on the RAM, and executes the program, and controls a data flow between each of the reader unit 303, the interface unit 306, and the image memory 307. Meanwhile, the image input/output controlling unit 305 may be also configured so that another nonvolatile memory, in which data is not deleted even when the power is turned off, is provided instead of the HDD 309, and data is stored in the nonvolatile memory.

Database Registering Process

Next, a flow will be described in which the identification information (information indicating an interdependence relation between apparatuses) on interdependence-related devices which are connected to the LAN is registered in the database 401 of the print controlling apparatus 200 and the image forming apparatus 300.

Figure 4:
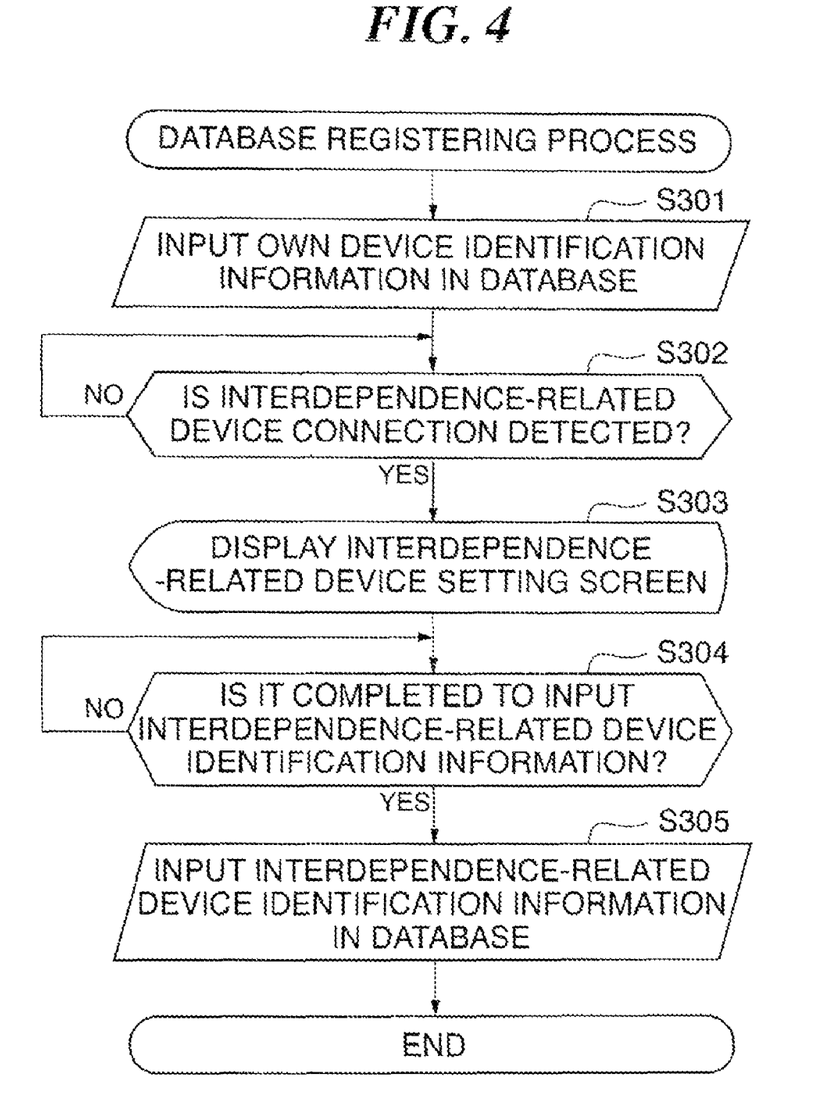
FIG. 4 is a flowchart illustrating a procedure of a database registering process of the print controlling apparatus and the image forming apparatus.

FIG. 4 is a flowchart illustrating a procedure of a database registering process of the print controlling apparatus 200 and the image forming apparatus 300.

In this database registering process, a processing program stored in, for example, the second memory unit 218 is read to be executed by the CPU in the print controlling apparatus 200, and a processing program stored in, for example, the HDD 309 is read to be executed by the CPU in the image forming apparatus 300.

First, the print controlling apparatus 200 and the image forming apparatus 300 register the own identification information in the database 401, respectively, when being initiated (step S301). An IP address, which is the identification information of the own device, is registered in an area 402 (refer to FIG. 6) of the database 401. Meanwhile, it is apparent that it is not necessary by storing the IP address in some storing means to execute this process at every initiation. If the device is provided with means which can maintain the set up information after a process for registering the database is also completed when setting up the device, it is apparent that it is not necessary that the database is registered at every initiation.

Figure 5:
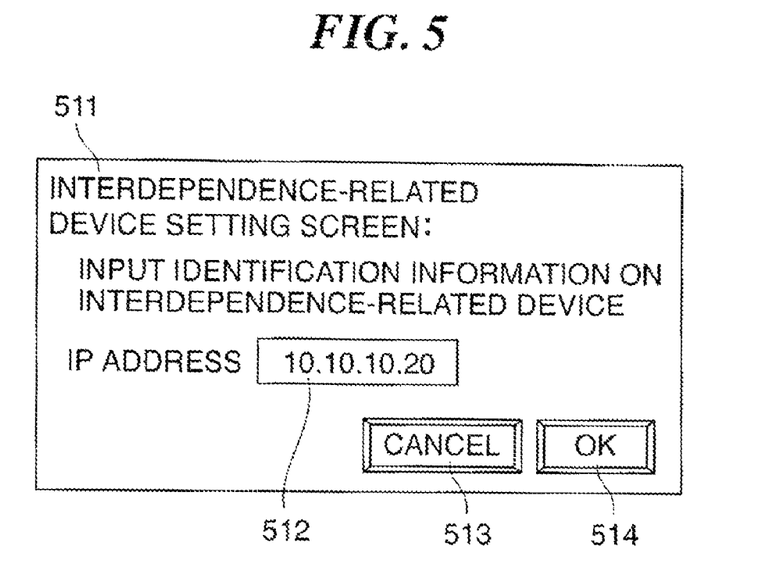
FIG. 5 is a view exemplifying a screen for setting a device with an interdependence relation.

Next, if the print controlling apparatus 200 and the image forming apparatus 300 are mutually connected (YES to the step S302), a screen illustrated in FIG. 5 for setting the interdependence-related device is displayed on each operation panel.

FIG. 5 is a view exemplifying a screen for setting the interdependence-related device.

In FIG. 5, Reference numeral 511 designates a dialog box for the interdependence-related device setting screen, 512 an input user interface for inputting the IP address used in the present embodiment as information for identifying the interdependence-related device, 513 a cancel switch for canceling the inputted setting, and 204 an OK switch for fixing the inputted setting.

A user of the print controlling apparatus 200 and the image forming apparatus 300 inputs the IP address of the opponent device (interdependence-related device) connected by the image signal connection line 2203 in the input interface 512 of the setting screen displayed in each operation panel, which enables the interdependence-related device to be specified which is interdependence-related to the own device. Meanwhile, in this embodiment, the identification information of the interdependence-related device is inputted by a manual input of the user. It is apparent that the identification information of the interdependence-related device can be automatically inputted by automatically exchanging the identification information through the image signal connection line 2203.

Returning to FIG. 4, if it is detected that it is completed to input the identification information of the above interdependence-related device (YES to the step S304), the identification information of the interdependence-related device is registered in the database 401 (step S305). The identification information is registered in an area 403 of the database 401 (refer to FIG. 6), and the database registering process is completed for the print controlling apparatus 200 and the image forming apparatus 300.

Figure 6:
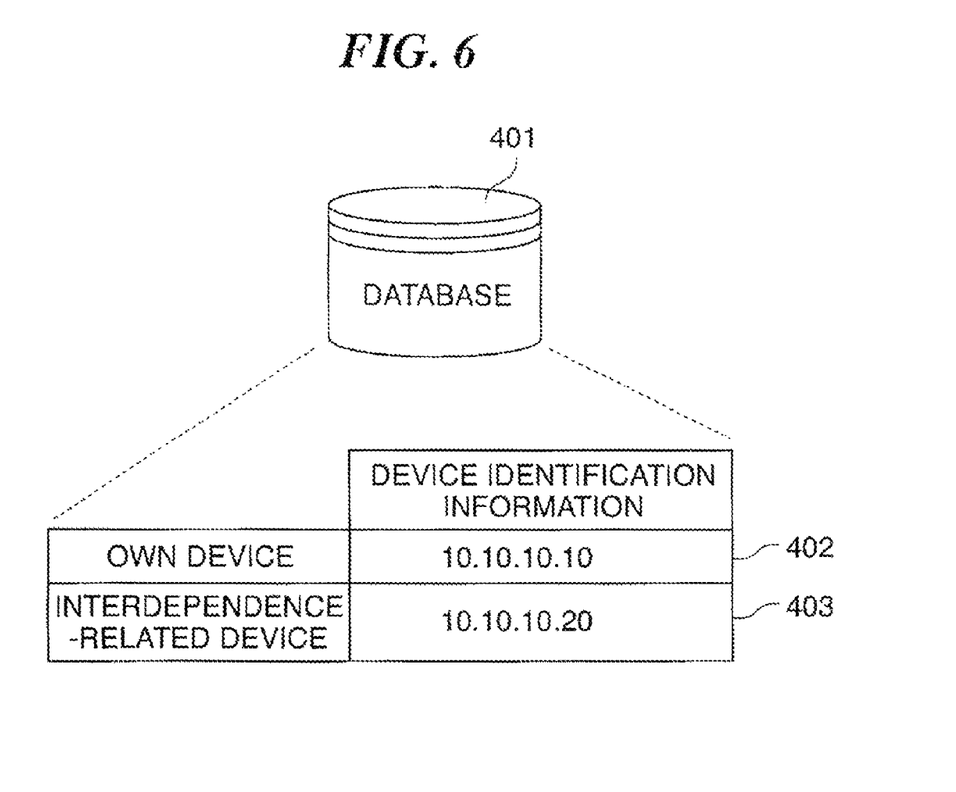
FIG. 6 is a view which is useful in illustrating a structure of a database in the print controlling apparatus and the image forming apparatus.

FIG. 6 is a view which is useful in illustrating a structure of the database 401 in the print controlling apparatus 200 and the image forming apparatus 300.

In FIG. 6, Reference numeral 402 designates an area in which the identification information of the own device is registered, and 403 an area in which the identification information of the opponent interdependence-related device (interdependence-related device) is registered. Meanwhile, in the present embodiment, this database is generated in each of the print controlling apparatus 200 and the image forming apparatus 300. It is apparent that the image forming system can be constructed in which the database is maintained by only one of the print controlling apparatus 200 and the image forming apparatus 300, and the device monitoring and managing program utilizes information on only the device maintaining the database.

Processing on the Information Processing Apparatus

Figure 7:
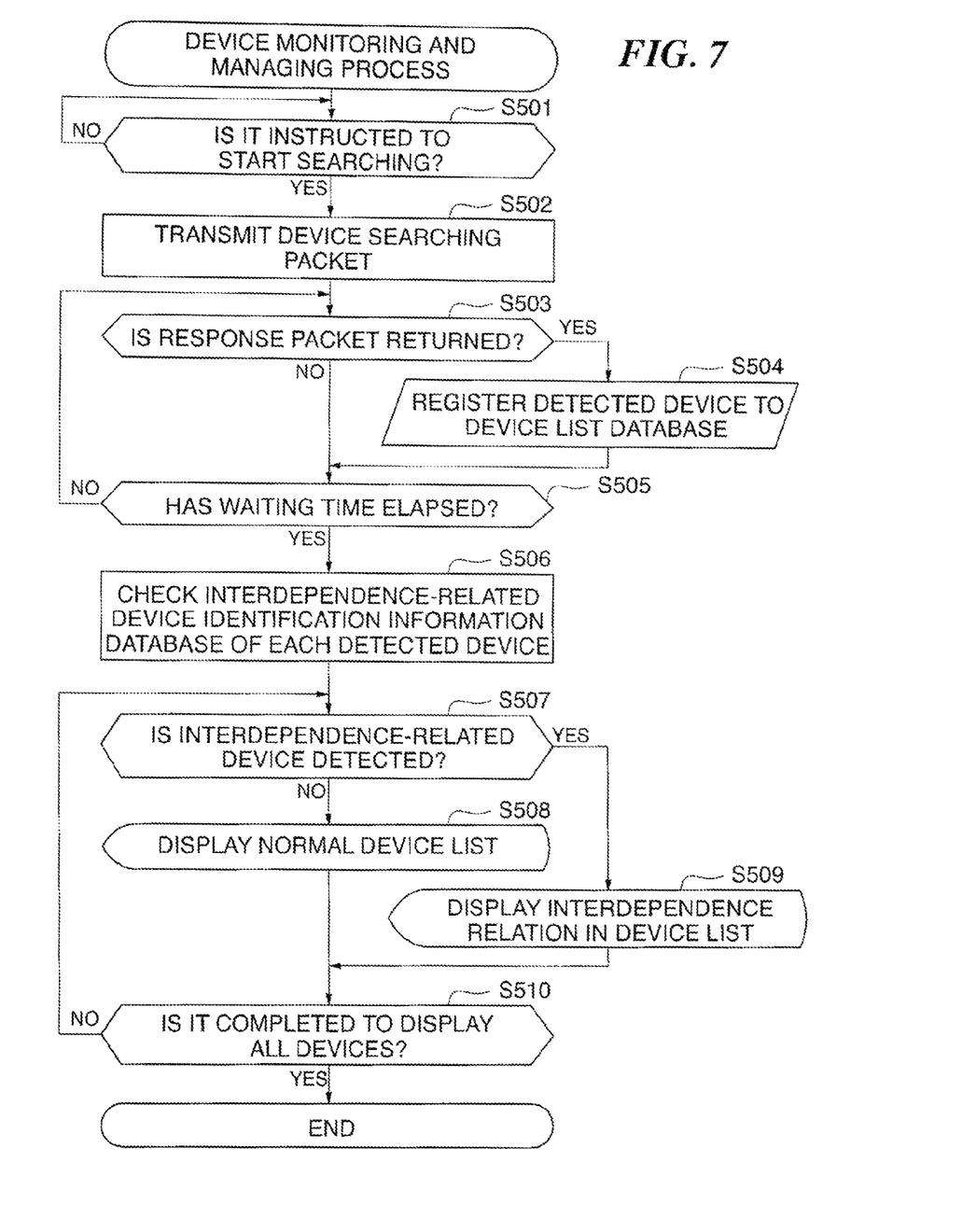
FIG. 7 is a flowchart illustrating a procedure of a device monitoring and managing process executed by the information processing apparatus.

FIG. 7 is a flowchart illustrating a procedure of the device monitoring and managing process executed by the information processing apparatus 100. The device monitoring and managing process executed on the information processing apparatus 100 detects the device connected on the LAN, and displays the interdependence relation on the device list.

First, if a search switch 2103 is pushed down by an operation of the user of the information processing apparatus 100 to be instructed to start the searching (YES to the S501), a device searching packet is transmitted (step S502). In the present embodiment, the device searching is executed by broadcast-transmitting a reading request command of the MIB by the SNMP. However, it is apparent that the similar device searching can be also executed by the SLP (Service Location Protocol), or another method.

The device searching packet is transferred on the LAN, and reaches another network devices connected on the LAN. Each of the devices receiving this packet on the network confirms whether or not to be able to reply for the MIB object which is requested to be read, respectively. The device which is determined to be able to reply returns a response packet to the information processing apparatus 100 which has transmitted a request packet.

Next, it is determined whether or not the response packet is returned from the device on the LAN (step S503). If affirmative, the MIB (Management Information Base) information (detected device) included in the response packet is registered in the database included in the information processing apparatus 100 as a device list database (FIG. 8) (step S504), followed by the process returning to the step S503 to wait for the response packet from another device again, until the waiting time has elapsed (NO to the step S505).

When it is not acknowledged, as a result of the determination at the step S503 that the response packet is returned, it is determined at step S505 whether or not the predetermined waiting time has elapsed. If the predetermined waiting time has not yet elapsed, the process returns to the step S503 since another response packet may be received. If it is determined at step S505 that the predetermined waiting time has elapsed (YES to the step S505), it is completed to wait for the response packet and register information included in the received response packet in the database.

Figure 8:
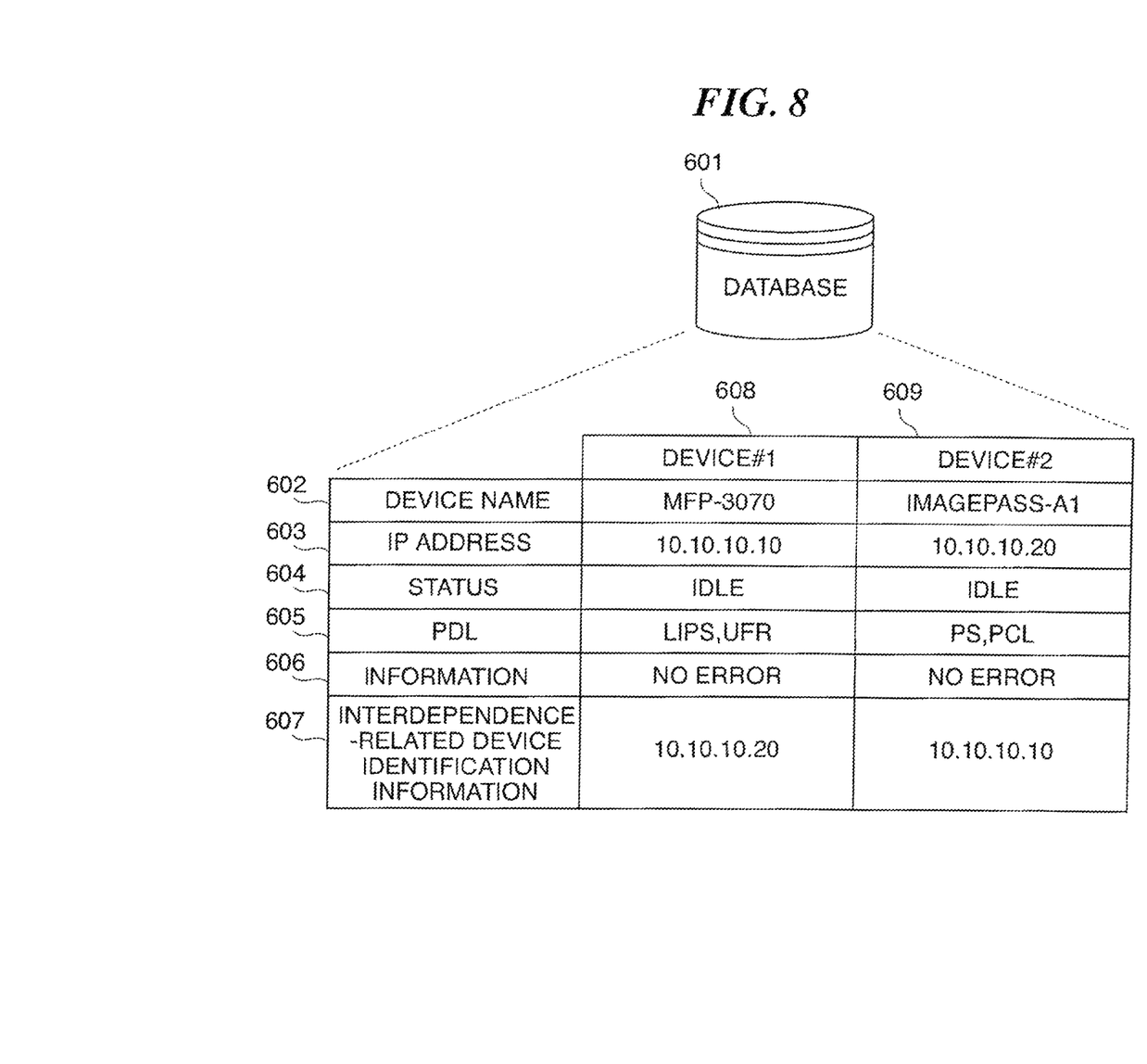
FIG. 8 is a view which is useful in illustrating an internal structure of a database of the information processing apparatus side.

FIG. 8 is a pattern diagram illustrating an internal structure in the database 601 in the information processing apparatus 100. The database 601 is, for example, stored in the external storing apparatus 105 of the information processing apparatus 100, and is utilized by the device monitoring and managing process program.

In FIG. 8, a row 602 is an area in which a Device name extracted from the response packet is registered. A row 603 is an area in which an IP address extracted from the response packet is registered. A row 604 is an area in which Status information extracted from the response packet is registered. A row 605 is an area in which PDL information extracted from the response packet is registered. A row 606 is an area in which information extracted from the response packet is registered. A row 607 is an area in which interdependence-related device identification information extracted from the response packet is registered.

Since columns 608 and 609 are generated for each network device receiving the response packet, when the response packet is received from the more network devices (not shown), the columns, whose number is the same as that of the network devices, are added. Meanwhile, information other than the information illustrated in FIG. 8 may be included in the response packet. For example, such information includes information indicating a type of the device (information indicating the print controlling apparatus or the image forming apparatus), ability information of the device, and the like.

Returning to FIG. 7, at step S506, an identification information database of the interdependence-related device of each detected device is checked by referring to the database

601, and an acknowledging process for acknowledging the interdependence-related device is executed with the check result. In the example of the database of FIG. 8, it is understood that the IP address of Device #1 is "10.10.10.10", and the IP address of the interdependence-related device is "10.10.10.20". On the hand, it is understood that the IP address of Device #2 is "10.10.10.20", and the IP address of the interdependence-related device is "10.10.10.10".

Thus, it can be acknowledged from this condition that there is the interdependence relation between the device owning the IP address "10.10.10.10" and the device owning the IP address "10.10.10.20". If the area 607 of the database does not include the effective identification information of the interdependence-related device, it can be determined that the device is not connected to the interdependence-related device.

It is determined at step S507 from an identification result of the above acknowledging process whether or not the interdependence-related device is detected. When it is not acknowledged as a result that the device is not the interdependence-related device, it is determined that the device is independently connected to the LAN, so that the normal device list display (for example, FIG. 11) is executed (step S508).

Figure 9:
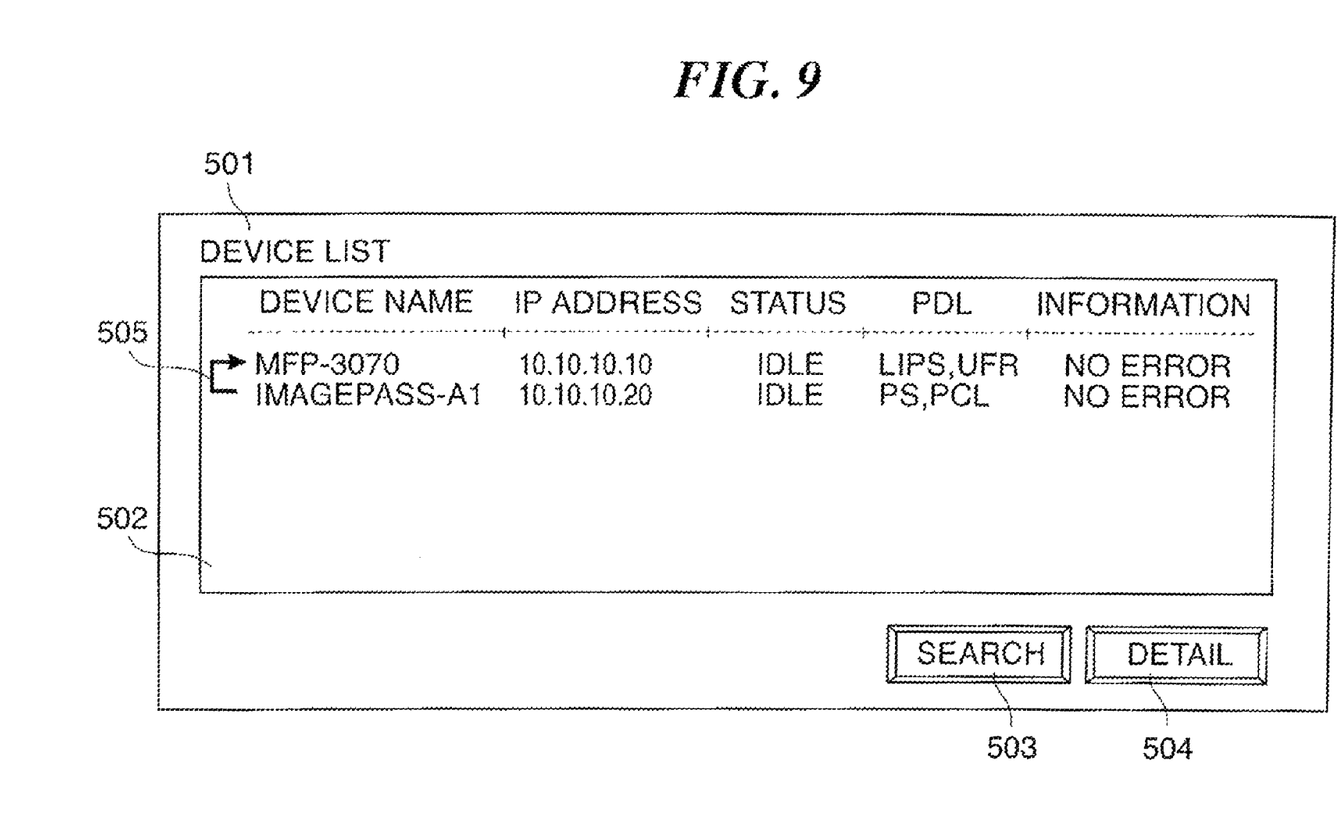
FIG. 9 is a view which is useful illustrating an exemplary display of a device list displayed by a device monitoring and managing program executed on the information processing apparatus.

On the other hand, as a result of the determination at step S507, when the interdependence-related device is acknowledged by the above acknowledging process, for illustrating the interdependence relation between the print controlling apparatus 200 and the image forming apparatus 300 as illustrated in FIG. 9, the screen of a display code 501 is displayed (step S509) (display unit). It is checked at step S510 whether or not it is completed to display all the detected devices, and when it is not completed, the process returns to the step S507 to continue the displaying process, on the other hand, when it is completed, it is terminated to display the device list.

Meanwhile, as a result of the determination at step S507, when the interdependence-related device is registered in only one device of two devices, it may be determined that such two devices are not interdependence-related to each other. That is, when it is registered in the first device that the first device is interdependence-related to the second device, it is supposed to be also registered in the second device that the second device is interdependence-related to the first device.

When the interdependence relation is registered in only one device, it is determined that such devices are not interdependence-related to each other. This could be a provision for the case that the interdependence-related device is erroneously registered in only one device. Even when the two devices do not mutually correspond to the interdependence-related devices, it is also determined that the two devices are not interdependence-related to each other. For example, this case is such a case that it is registered in the first device that the second device is interdependence-related to the first device, on the other hand, it is registered in the second device that the third device is interdependence-related to the second device.

By contraries, when the interdependence-related device is registered in only one device of the two devices, it may be determined that such two devices are interdependence-related to each other. This could be a provision for the case that the interdependence relation is registered in only one device of the two devices without registering the interdependence relation in both devices.

FIG. 9 is a view which is useful in illustrating an exemplary display of the device list displayed at the step S509 in FIG. 7.

In FIG. 9, Reference numeral 501 designates a dialog box screen of the device list, and 502 a window box for list-displaying the device detected by the device monitoring and managing process program, 503 a search switch which is a trigger for searching the device, and 504 a detail switch for moving to a detail information screen of the device selected on the device list.

When the search switch 503 is pushed down by a user of the information processing apparatus 100, the device monitoring and managing program searches the device which is connected on the LAN and is to be managed, and displays the detected device in the window box 502 of the device list as a result.

The detail switch 504 is used when the user needs to refer to more detailed information on the device displayed in the device list, or needs to change the setting of the device. That is, a device detail screen (not shown) is displayed by selecting the desired device from the device list, and pushing down the detail switch 504. It becomes possible to move to an operation screen for displaying more detailed information on the device selected by the user of the information processing apparatus 100, or changing the setting of the device.

In FIG. 9, reference numeral 505 designates a display code for visually displaying that the image forming apparatus 300 and the print controlling apparatus 200 are mutually connected and are interdependence-related to each other. The display code 505 indicates by using an arrow in the present embodiment that both apparatuses are interdependence-related to each other. Here, it is desirable that the arrow is directed from the print controlling apparatus 200 to the image forming apparatus 300. Thus, information is referred to, which is included in the response packet received from the image forming apparatus 300 and the print controlling apparatus 200, and indicates a type of the device. It is apparent that the interdependence relation can be indicated by using a variety of techniques such as a technique for bracketing off, a technique for using the same background color, and a technique for framing. It is also apparent that a technique is considered and is effective which further assists the visual acknowledgement by using a higher-level graphic image, an icon, and the like.

The window box 502 of the device list displays "Device name", "IP address", "Status", and "Information" which are related to the device detected on the LAN. In addition, the PDL (Page Description Language) supported by each detected device is also displayed. The device monitoring and managing program obtains such information by using the SNMP, and displays such information in the window box 502. That is, the device monitoring and managing program obtains information on the Device name, the IP address, the Status, and the Information from the MIB object of the image forming apparatus 300 by using the SNMP. The device monitoring and managing program visually provides the user of the information processing apparatus 100 with information on the detected device by displaying the obtained information in the window box 502 of the device list.

Advantages According to the Present Embodiment

As shown in FIG. 9, from the above processes, the device monitoring and managing program executed on the information processing apparatus 100 becomes able to display the device detected by the searching process in the window box 502 of the device list, and to display the interconnection relation. It becomes able to be acknowledged by the illustrated display code 505 that the devices displayed in the device list are connected with the interdependence relation. In addition, the PDL information supported by each device is also illustrated.

As described above, even when the print controlling apparatus 200 and the image forming apparatus 300 are connected to the LAN respectively, the device side to be searched can respond to the device searching operation, which is executed on the LAN by the information processing apparatus 100, without misinforming the user of the information processing apparatus 100. This enables the user to quickly and securely set up the image forming apparatus 300. Each device connected on the LAN can utilize all the network functions provided by the image forming apparatus 300, and such an effect is also induced that the load and the work for developing and manufacturing the print controlling apparatus 200 are reduced.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-177633 filed Jul. 5, 2007, which is hereby incorporated by reference herein in its entirety.

What is claimed is:

1. An information processing apparatus that is capable of communicating with a first device and a second device through a network, respectively, the information processing apparatus comprising:
a transmitting unit adapted to transmit, to the network, searching information used for searching a device;
a receiving unit adapted to receive responses to the transmitted searching information from the first device and the second device on the network, respectively; and
a displaying unit adapted to display a search result of the device based on the responses received by said receiving unit,
wherein said displaying unit is adapted to display, as the search result, discrimination information representing that the first device and the second device are connected to each other through a communicating unit that is different than the network.

2. The information processing apparatus as claimed in claim 1, wherein said receiving unit is adapted to receive the discrimination information from at least one of the first device and the second device.

3. The information processing apparatus as claimed in claim 1, wherein said receiving unit is adapted to receive device information from each of the first device and the second device.

4. The information processing apparatus as claimed in claim 1, wherein the device information includes address information in the network, and said displaying unit is adapted to display the address information of the first device and the address information of the second device.

5. The information processing apparatus as claimed in claim 1, wherein the first device comprises an image forming apparatus, and the second device comprises a print controlling apparatus.

6. A control method for an information processing apparatus that is capable of communicating with a first device and a second device through a network, respectively, the method comprising:
a transmitting step of transmitting, to the network, searching information used for searching a device;
a receiving step of receiving responses to the transmitted searching information from the first device and the second device on the network, respectively; and
a displaying step of displaying a search result of the device based on the responses received in said receiving step,
wherein said displaying step comprises displaying, as the search result, discrimination information representing that the first device and the second device are connected to each other through a communicating unit that is different than the network.

7. A non-transitory computer-readable storage medium storing a program for causing a computer to implement a control method for an information processing apparatus that is capable of communicating with a first device and a second device through a network, respectively, the method comprising:
a transmitting step of transmitting, to the network, searching information used for searching a device;
a receiving step of receiving responses to the transmitted searching information from the first device and the second device on the network, respectively; and
a displaying step of displaying a search result of the device based on the responses received in said receiving step,
wherein said displaying step comprises displaying, as the search result, discrimination information representing that the first device and the second device are connected to each other through a communicating unit that is different than the network.

* * * * *